ated Oct. 21, 1958

2,857,282
INHIBITION OF ENZYMES IN PLANT TISSUE

Eugene F. Jansen, Berkeley, Calif., assignor to the United States of America as represented by the Secretary of Agriculture No Drawing. Application September 27, 1957
Serial No. 686,795

7 Claims. (Cl. 99—154)

(Granted under Title 35, U. S. Code (1952), sec. 266)

A non-exclusive, irrevocable, royalty-free license in the invention herein described, for all governmental purposes, throughout the world, with the power to grant sub-licenses for such purposes, is hereby granted to the Government of the United States of America.

This invention relates to the preservation of edible plant materials such as fruits and vegetables. More particularly, the invention concerns the treatment of plant materials containing active enzymes whereby to maintain the natural color of these products and otherwise protect them from the deleterious effects which are normally caused by the enzymes therein. The objects of the invention include the provision of processes wherein raw edible plant material is treated with certain agents to inhibit enzyme action whereby the treated plant material can be further processed and stored with maintenance of its original characteristics of color, texture, odor, and flavor. Further objects and advantages of the invention will be evident from the following description.

It is well known that raw plant tissue is subject to deleterious changes particularly when the natural structure is disorganized as by peeling, cutting, comminuting, pitting, pulping, freezing, etc. The deteriorative changes which occur include the development of dark and unnatural colors (browning), softening of tissue, oozing of liquid from the tissue, and development of unnatural odor and taste. These effects are generally attributed to various chemical reactions catalyzed by the enzymes naturally present in the plant tissue. The disorganization of the natural structure disrupts the orderly segregation of substrates and enzymes and thus permits random contact of enzymes and substrates with the untoward results noted above. In any preservation process whether it involves dehydration, freezing, cold storage, canning, or any combination of these, one must provide some means for controlling enzyme action if an acceptable product is to be produced.

In general according to the present invention, raw edible plant material which is normally subject to enzymatic deterioration is treated with an enzyme inhibiting agent of the type hereinafter described. These agents will prevent or at least inhibit enzyme activity in the plant tissue whereby browning and other deleterious changes normally caused by enzyme action are prevented or substantially retarded.

The agents employed in accordance with the invention are N-acyl derivatives of mercapto amines. These compounds exhibit a unique ability to inhibit enzyme activity and thus their presence prevents deleterious changes such as browning normally caused by enzyme action. The agents are generically defined as compounds of the formula $$R-\overset{O}{\underset{\|}{C}}-NH-R'-SH$$

wherein

is an aliphatic acyl radical and R' is an aliphatic hydrocarbon radical.

The acyl radical

may be derived from monobasic or polybasic carboxylic acids and may be unsubstituted or contain hydroxy substituents. Thus, for example, the acyl radical may be derived from monobasic acids such as acetic, propionic, butyric, valeric, caproic, caprylic, capric, lauric, etc.; from polybasic acids such as malonic, succinic, glutaric, adipic, pimelic, suberic, azelaic, sebacic, etc.; or from hydroxy acids such as glycollic, lactic, hydroxybutyric, hydroxyvaleric, hydroxycaproic, hydroxycaprylic, hydroxycapric, hydroxylauric, pantoic, malic, citramalic, tartaric, citric, etc.

The remainder of the compound (—NH—R'—SH) is preferably the residue of 2-mercaptoethylamine but may be derived from other mercapto amines, for example, 2-mercapto propylamine, 3-mercaptopropylamine; 2-mercapto butylamine; 3-mercapto butylamine; 4-mercapto butylamine; 2-mercapto hexylamine; 3-mercapto hexylamine; 4-mercapto hexylamine; 5-mercapto hexylamine; 6-mercapto hexylamine; the various isomeric mercaptosubstituted octyl, decyl and dodecylamines, and the like.

Examples of specific compounds coming within the scope of the invention are set forth below by way of illustration but not limitation.

N(2-mercaptoethyl) acetamide; N(2-mercaptoethyl) propionamide; N(2 - mercaptoethyl) butyramide; N(2-mercaptoethyl) isobutyramide; N(2-mercaptotoethyl) valeramide; N(2-mercaptoethyl) caproic acid amine; N(2-mercaptoethyl) caprylic acid amide; N(2-mercaptoethyl) capric acid amide; N(2-mercaptoethyl) lauric acid amide; N(2-mercaptoethyl) malonamic acid; N(2-mercaptoethyl) succinamic acid; N(2-mercaptoethyl) glutaramic acid; N(2-mercaptoethyl) adipamic acid; N(2-mercaptoethyl) pimelamic acid; N(2-mercaptoethyl) suberamic acid; N(2-mercaptoethyl) azelamic acid; N(2-mercaptoethyl) sebacamic acid; N(2-mercaptoethyl) glycollamide; N(2-mercaptoethyl) lactamide; N(2-mercaptoethyl) β-hydroxypropionamide; N(2-mercaptoethyl) β-hydroxybutyramide; N(2-mercaptoethyl) pantoic acid amide; N(2-mercaptoethyl) malamic acid; N(2-mercaptoethyl) citramalamic acid; and N(2-mercaptoethyl) tartaric acid monamide.

Practice of the present invention essentially involves treating the raw plant material with any of the described agents. The agents may be applied in solution form to the plant material by such conventional methods as dipping or spraying. To get maximum penetration of the treating solution into the plant material, vacuum or pressure, or both, may be applied. Where the plant material is in comminuted, pulp, or juice form the selected agent may be simply incorporated into the mass of plant material. Instead of using solutions of the agents they may be applied to the surfaces of plant materials as such or diluted with a harmless carrier such as cereal meals, cereal bran, starch, flour, sucrose, glucose, sorbitol, dextrin, pectin, dextran, alginic acid, edible oil, salt, dehydrated milk, dehydrated whey, powdered dehydrated fruit or vegetable juice, etc.

After the selected agent has been applied to the plant material, the treated material may be preserved by any conventional technique including cold storage, freezing, concentration, dehydration, canning, brining, smoking, etc., including combinations of these such as dehydrofreezing and dehydrocanning.

Illustrative examples of methods of applying the agents to various types of produce are set forth below although it is to be understood that the method of applying the agents does not form any critical part of the invention.

Example I

Potatoes are peeled, washed, then dipped in an aqueous solution of one of the described agents in a concentration of about 0.01 to 5%. The potatoes are removed from the bath, drained, packaged in wax paper cartons and stored at about 32–50° F. Such storage is for temporary preservation (about a week). If desired, the potatoes may be sliced prior to dipping to provide a product instantly available for making French-fried potatoes.

Example II

Apples are peeled, cored, sliced, then dipped in a solution of one of the described agents in a concentration of about 0.01 to 5%. The slices are removed from the bath, drained, packaged in cartons (with or without added sugar), frozen, and maintained in frozen storage.

The types of treatment shown above in Examples I and II are, of course, applicable to many other classes of produce such as peaches, pears, apricots, berries, peas, beans, cabbage, broccoli, cauliflower, etc. It is also evident that the enzyme inhibiting solution can be applied to the plant material by spraying instead of dipping.

Where the produce to be preserved is in comminuted or liquefied form as a sauce, puree, pulp, nectar, juice, concentrated juice, etc., the selected agent may be simply incorporated into the material prior to further treatment as freezing concentration, dehydration, etc. Moreover, the enzyme-inhibiting agent may be applied to the produce prior to comminuting to prevent darkening during this step of the processing. Such technique is further described below:

Example III

Fresh apricots are washed, dipped in a solution of one of the described agents, then mashed. The mashed product is screened to remove pits, skins, etc. To the screened puree is then added with vigorous mixing one of the described agents to establish a concentration of about 0.1% thereof in the puree. Sugar may also be added to sweeten the product if desired. The puree is then packaged and frozen.

Example IV

Peaches are washed, peeled and halved. The halves are then immersed in an aqueous 0.01 to 5% solution of one of the described agents. The halves are left in the solution until ready for canning whereby during this period browning of the fruit is prevented. In canning the product the peach halves are removed from the bath, drained, placed in cans with syrup, the cans being then sealed and heat processed in the usual manner to ensure sterility.

The above procedure may be applied to other forms of plant material to protect the color thereof in the interim between the time when the produce is peeled, sliced, comminuted, etc. and the time when the product is canned and the enzymes thus inactivated.

It is sometimes desirable to use an impregnation technique to cause the solution of the enzyme inhibiting agent to penetrate deep into the tissue of the plant material and thus protect inner parts of the tissue as well as the surface from enzymic discoloration. Such impregnation can be readily accomplished by immersing the produce in a solution of the enzyme-inhibiting agent then subjecting the system to vacuum to draw air or other gases out of the plant tissue to allow deep penetration of the solution. This technique is particularly effective with fruit such as apples and pears which normally contain a considerable amount of air in the interstices of the fruit tissue. The solution used for impregnating may contain sugar or other flavoring material to, at the same time, sweeten or otherwise flavor the fruit. The following example illustrates such a technique.

Example V

Apples are peeled, cored and sliced. The slices are placed in a jar and covered with a solution containing 60% sucrose and about 0.1% of any one of the described agents. A vacuum is then applied over the surface of the liquid and maintained until most of the air is exhausted from the apple tissue, i. e., until frothing and bubbling cease. The vacuum is then broken and after remaining in the syrup a few minutes the apple slices are removed, drained, packaged and frozen.

Example VI

Apples are washed thoroughly, dipped in a solution of one of the described enzyme-inhibiting agents then mashed. The mashed product is screened to remove skins, pits, tough membranes, stems, etc. The screened puree is then admixed with enough of the described agent to establish a concentration of about 0.1% in the puree. The puree is then dehydrated to a solid state employing the procedure of Example III in Pat. No. 2,785,077.

Example VII

Fresh Elberta peaches were peeled, sliced and packed into No. 2 cans. Each can contained 400 grams peach slices and 172 grams of a 50% sugar syrup. In the control pack, the syrup contained no added ingredient. In another pack, the syrup contained 0.125% ascorbic acid as representing a conventional antioxidant. In the third and fourth packs, the syrups contained 0.125% of N(2-mercaptoethyl) pantoic acid amide and 0.125% of N(2-mercaptoethyl) succinamic acid, respectively, as typical agents contemplated by this invention.

The canned peaches were then frozen and stored at 0° F. for 6 months. After this period of storage, the cans were immersed in water at 70° F. for 2½ hrs. to thaw the contents. The thawed peach slices were then removed from the cans and allowed to stand in air while observing their color. It was noted that the control slices darkened almost immediately, the slices packed with ascorbic acid darkened in about 20 minutes and the slices packed with N(2-mercaptoethyl)pantoic acid amide and N(2-mercaptoethyl) succinamic acid did not darken until after about 80 minutes of exposure to air.

The invention may be applied to any type of edible plant material as, for example, potatoes, sweetpotatoes, carrots, peas, beans, cabbage, spinach, broccoli, avocados, mushrooms, cauliflower, squash, peaches, apples, pears, nectarines, plums, apricots, walnut meats, figs, dates, etc. The proportion of inactivating agent to be applied in any particular case will depend on such factors as the type of produce in question, the degree of stability desired, the effectiveness of the agent selected, and so forth. For instance, produce which exhibits very active browning tendencies, e. g., apples, will require more of the stabilizing agent than will a material of lesser browning tendencies such as string beans. Moreover, if the end sought is merely a temporary stabilization less of the stabilizing agent will be needed than where the aim is to preserve a product indefinitely. In any particular case, the optimum amount of agent can easily be determined by conducting pilot experiments on small lots of the fruit or vegetable in question employing, for example, accelerated storage conditions to obtain more rapid evaluation. In any event the amount of agent is not critical as any proportion of agent will result in improvement of stability. Usually, the agent is applied to the plant material as a solution having a concentration of about 0.01 to 5%, or, if the agent is added to the plant material enough is employed so that the composite material contains about the aforesaid proportion of the agent. As described above, one method of applying the stabilizing agent to the fruit involves use of a solution of the agent. Generally water is used as the solvent where the selected agent is soluble therein. With the agents of low solubility one may employ other solvents as for example ethyl alcohol, mixtures of ethyl alcohol and water, ethylene glycol, glycerine, edible oils, etc.

Having thus described my invention, I claim:

1. A method comprising treating raw edible plant material normally subject to enzymatic deterioration with a compound of the formula

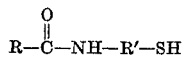

wherein

is an aliphatic acyl radical and R' is an aliphatic hydrocarbon radical, the said compound being applied in a concentration about from 0.01 to 5% to inhibit the enzymatic deterioration.

2. The method of claim 1 wherein R' is the —$CH_2$—$CH_2$-radical.

3. The method of claim 1 wherein the compound is N(2-mercaptoethyl) succinamic acid.

4. The method of claim 1 wherein the compound is N(2-mercaptoethyl) pantoic acid amide.

5. The method of claim 1 wherein the compound is N(2-mercaptoethyl) acetamide.

6. The method of claim 1 wherein the compound is N(2-mercaptoethyl) glycollamide.

7. The method of claim 1 wherein the compound is N(2-mercaptoethyl) propionamide.

References Cited in the file of this patent

UNITED STATES PATENTS

| | | |
|---|---|---|
| 2,011,465 | Balls | Aug. 13, 1935 |
| 2,323,111 | Austin | June 29, 1943 |
| 2,604,409 | Cothran | July 22, 1952 |